March 16, 1971

KENICHI KITAMURA ET AL 3,570,117

METHOD OF MAKING SQUIRREL-CAGE OUTER ROTOR FOR OUTER ROTOR TYPE SQUIRREL-CAGE INDUCTION MOTORS

Filed Oct. 26, 1967

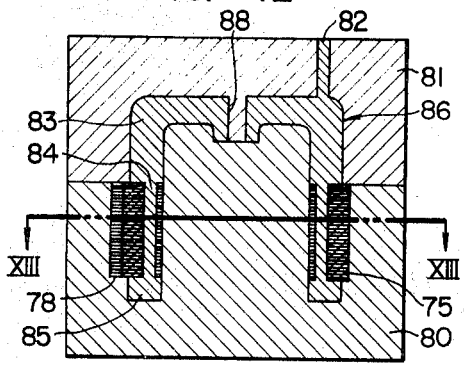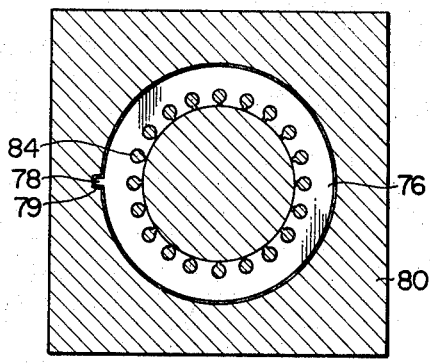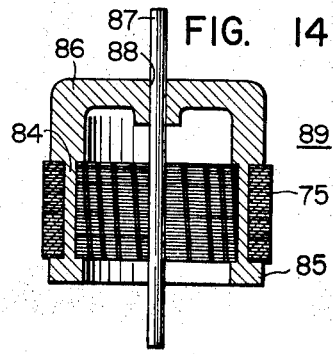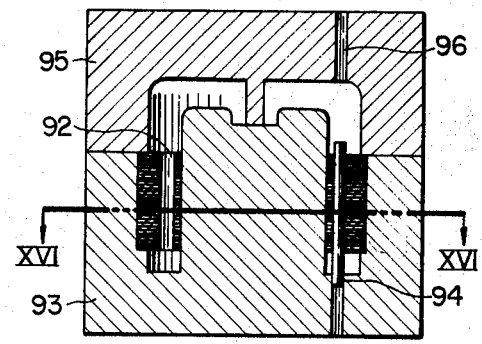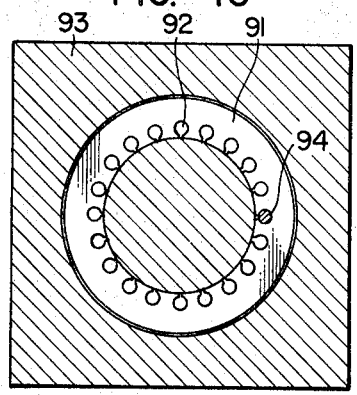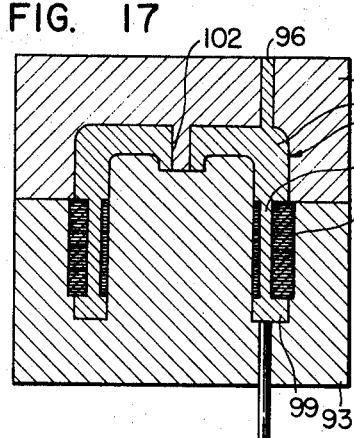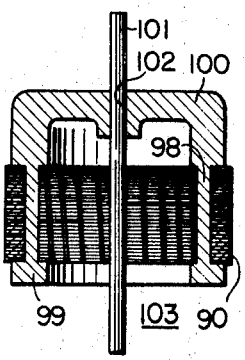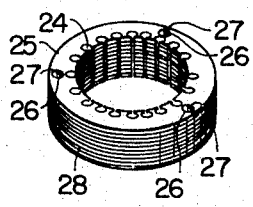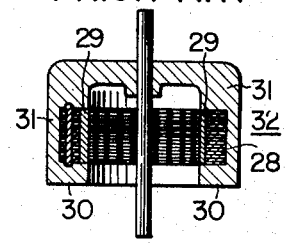

United States Patent Office 3,570,117
Patented Mar. 16, 1971

3,570,117
METHOD OF MAKING SQUIRREL-CAGE OUTER ROTOR FOR OUTER ROTOR TYPE SQUIRREL-CAGE INDUCTION MOTORS
Kenichi Kitamura, Yokohama-shi, and Seiichi Watanabe, Zushi-shi, Japan, assignors to Victor Company of Japan, Ltd., Yokohama, Japan
Filed Oct. 26, 1967, Ser. No. 678,392
Claims priority, application Japan, Oct. 28, 1966, 41/70,766
Int. Cl. H02k 15/02
U.S. Cl. 29—598        2 Claims

ABSTRACT OF THE DISCLOSURE

A squirrel-cage outer rotor and a method of making the same wherein annular magnetic laminae provided with slots into which rotor conductors are to be respectively inserted along the inner peripheries are laminated to a proper thickness to form an iron core of a squirrel-cage outer rotor and are die-cast while fixed and held with a jig or die-casting metallic dies on the outer or inner peripheries or in the slots so that the above mentioned iron core may be molded integrally with rotor conductors, an end ring and a housing.

BACKGROUND OF THE INVENTION

This invention relates to rotors for outer rotor type motors and methods of making the same and more particularly to a squirrel-cage outer rotor for outer rotor type squirrel-cage induction motors made by molding an iron core integrally with rotor conductors, an end ring and a housing by die-casting and a method of making the same.

Generally, a squirrel-cage outer rotor for outer rotor type squirrel-cage induction motors in which a squirrel-cage rotor rotates outside a stator is formed of an iron core made by laminating annular magnetic laminae provided with slots into which rotor conductors are to be respectively inserted along the inner peripheries, rotor conductors inserted respectively in the slots in said iron core, an end ring short-circuiting said rotor conductors and a housing for the rotor. There has been carried out a method wherein the above mentioned laminated iron core is fixed and held with rivets in a plurality of places and is then molded integrally with the rotor conductors, an end ring and a housing by die-casting. However, according to such method, there are drawbacks that it is necessary to make rivet inserting holes in the magnetic laminae forming the iron core and not only that fastening steps with rivets and material costs of rivets are required but also that the magnetic resistance in the rivet inserting parts will increase. This influence will be large especially in the case of a small motor in which the yoke part is narrow Further, there is a great drawback in the performance that it is so difficult to skew the conductor that, at the time of the rotation, the torque will be small and the vibration and noise will be large.

SUMMARY OF THE INVENTION

The present invention has eliminated the above mentioned conventional drawbacks by die-casting a laminated iron core while fixing and holding it with a jig or die-casting metallic dies on the outer or inner periphery or in the slot parts.

A main object of the present invention is to provide a squirrel-cage outer rotor small in the magnetic resistance and high in the rotating performance.

Another object of the present invention is to provide a method of making new squirrel-cage outer rotors without fastening iron cores with rivets.

A further object of the present invention is to provide a method of making squirrel-cage outer rotors adapted to mass-production by reducing the steps and material costs, improving the productivity and reducing the costs.

Other objects and features of the present invention will become clear from the explanation with reference to the drawings.

BRIEF DESCRIPTION OF THE DRAWINGS

FIG. 3 is a vertically sectioned side view showing the state as the iron core shown in FIG. 2 is put in die-casting metallic dies and a molten metal is poured in.

FIG. 4 is a vertically sectioned view showing a squirrel-cage outer rotor molded by the first method.

FIG. 5 is a perspective view showing a laminated iron core as fixed and held by being soldered in several places along the outer periphery.

FIG. 6 is a vertically sectioned side view showing the state as the iron core is put in die-casting metallic dies and a molten metal is poured in.

FIG. 7 is a vertically sectioned side view showing a squirrel-cage outer rotor made by the second method.

FIG. 8 is a perspective view showing a laminated iron core as fixed and held with several rotor conductors.

FIG. 9 is a vertically sectioned side view showing the state as a molten metal is poured into die-casting metallic dies.

FIG. 10 is a vertically sectioned side view showing a squirrel-cage outer rotor made by the third method.

FIGS. 11 to 14 are views showing an embodiment of the fourth method of the present invention.

FIG. 11 is a plan view of a magnetic laminar forming an iron core.

FIG. 12 is a vertically sectioned side view showing the state as the iron core is put in die-casting metallic dies and a molten metal is poured in.

FIG. 13 is a cross-sectioned view on line XIII—XIII in FIG. 12.

FIG. 14 is a vertically sectioned side view showing a squirrel-cage outer rotor made by the fourth method.

FIGS. 15 to 18 are explanatory views showing an embodiment of the fifth method of the present invention.

FIG. 15 is a vertically sectioned side view showing the state as a pin is inserted into each of several slots into which rotor conductors are to be inserted in a laminated iron core and the iron core is put in die-casting metallic dies.

FIG. 16 is a cross-sectioned view on line XVI—XVI in FIG. 15.

FIG. 17 is a vertically sectioned side view showing the state as the pin is pulled out and a molten metal is FIG. 18 is a vertically sectioned side view showing a cage type outer rotor made by the fifth method.

FIGS. 19 and 20 are views showing a conventional method.

FIG. 19 is a perspective view showing a laminated iron core as fixed and held with rivets.

FIG. 20 is a vertically sectioned view showing a squirrel-cage outer rotor made by the conventional method.

DESCRIPTION OF THE PREFERRED EMBODIMENTS

Figure 1:
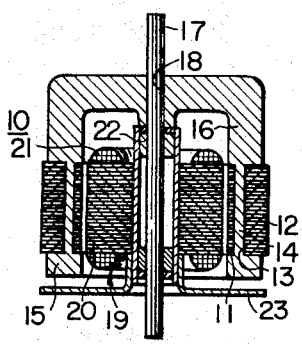
FIG. 1 is a vertically sectioned side view of an outer rotor type squirrel-cage induction motor.

In FIG. 1, 10 is a squirrel-cage outer rotor formed of an annular iron core 12 made by laminating such magnetic laminar 11 as silicon steel sheets, rotor conductors 14 made of such conductive material as aluminum and inserted respectively into slots made in the above mentioned iron core 12, an end ring 15 short-circuiting said rotor conductors and a housing 16. 17 is a rotor shaft fitted and secured in a rotor shaft fitting hole 18 made in the center of the housing of said rotor. 19 is a stator provided inside said rotor and consisting of a radial iron core 20 and a winding 21 applied to said iron core. A bearing 22 is provided in the center part of said stator so as to bear the above mentioned rotor shaft 17. 23 is a motor holder fitted to the lower part of the above mentioned bearing 22.

In a conventional method of making such squirrel-cage outer rotor, as shown in FIGS. 19 and 20, annular silicon steel sheets 25 having slots 24 for inserting respective rotor conductors along the inner peripheries are laminated to a proper thickness, rivets 27 are inserted respectively into rivet inserting holes 26 made in the laminating direction separately from the above mentioned slots, said rivets are fastened to form an iron core 28, said iron core is put into die-casting metallic dies and such conductive material as aluminum is cast into the dies so that the iron core may be molded integrally with rotor conductors 29, an end ring 30 and a housing 31. In this conventional method, there are such drawbacks that it is necessary to make rivet inserting holes, that rivet fastening steps and rivet material costs are required and that the magnetic resistance in the rivet inserting parts will increase.

Figure 2:
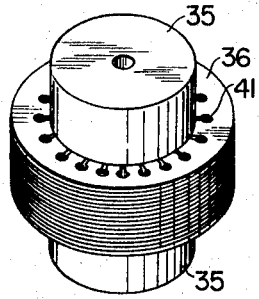
FIGS. 2 to 4 are explanatory views showing an embodiment of the first method of the present invention.
Figure 3:
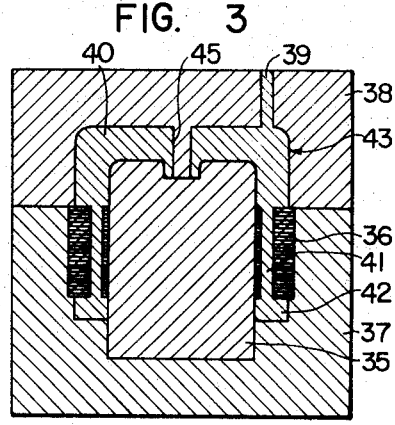
Figure 4:
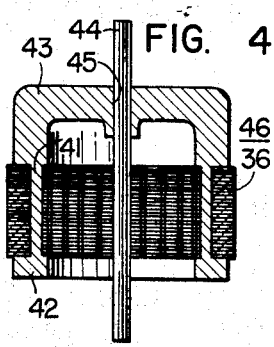

First of all, an embodiment of the first method shall be explained with reference to FIGS. 2 to 4.

Slots 34 into which rotor conductors are to be respectively inserted are formed along the inner peripheries of such magnetic laminae 33 as annular silicon steel sheets forming an iron core of a squirrel-cage outer rotor, said magnetic laminar 33 are pressed on the inner peripheries onto a jig 35 by arranging the slots 34 or by twisting the slots in the case of skewing the slots, are laminated to be an iron core 36 of a proper thickness and are put as fixed and held into die-casting metallic dies 37 and 38, a melt 40 of such conductive substance as, for example, aluminum is poured into the dies through a pouring gate 39 in the die-casting metallic die 38 so that the above mentioned iron core 36 may be molded integrally with rotor conductors 41, an end ring 42 and a housing, then the die-casting metallic dies 37 and 38 and the jig 35 are removed, a rotor shaft 44 is pressed and secured in a rotor shaft fitting hole 45 formed integrally in the housing 43 so that a rotor 46 for an outer rotor type squirrel-cage induction motor may be made.

In the above mentioned embodiment, the magnetic laminae 33 are fixed and held on the inner peripheries with the jig 35. But, in another embodiment, the magnetic laminae may be fixed and held on the outer peripheries with a jig of a proper form.

Figure 5:
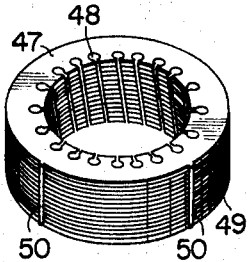
FIGS. 5 to 7 are explanatory views showing an embodiment of the second method of the present invention.
Figure 6:
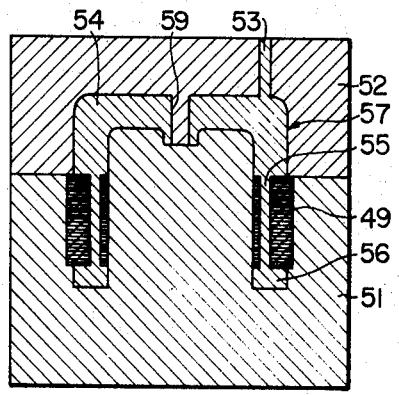
Figure 7:
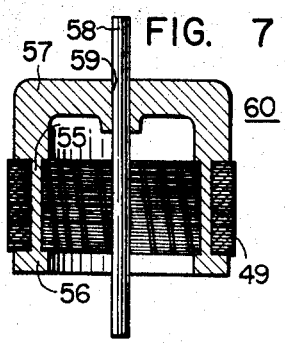

In an embodiment of the second method, as shown in FIGS. 5 to 7, slots 48 into which rotor conductors are to be respectively inserted are formed along the inner peripheries of such magnetic laminar 47 as annular silicon steel sheets forming an iron core of a squirrel-cage outer rotor, said magnetic laminae 47 are laminated to be an iron core 49 of a proper thickness by arranging the slots 48 or by twisting the slots 48 in the case of skewing the slots, are welded in the laminating direction in several places on the outer peripheries and are put in the thus temporarily fixed state into die-casting metallic dies 51 and 52, a melt 54 of such conductive substance as, for example, aluminum is poured into the dies through a pouring gate 53 in the die-casting metallic die 52 so that the above mentioned iron core 49 may be molded integrally with rotor conductors 55, an end ring 56 and a housing 57, then the die-casting metallic dies 51 and 52 are removed, the welded parts 50 are scraped off as required and a rotor shaft 58 is pressed and secured in a rotor shaft fitting hole 59 formed integrally in the housing 57 so that a rotor 60 for an outer rotor type squirrel-cage induction motor may be made.

In the above mentioned embodiment, the magnetic laminae are welded in the laminating direction on the outer peripheries. But, in another embodiment, they may be welded and fixed in the laminating direction on the inner peripheries.

As the welding is for temporary fixing until the die-casting, after the die-casting, if these welded parts are scraped off, the electric conduction between the magnetic laminae will be prevented and the performance will improve.

Figure 8:
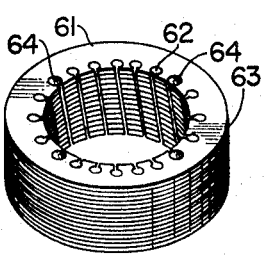
FIGS. 8 to 10 are explanatory views showing an embodiment of the third method of the present invention.
Figure 9:
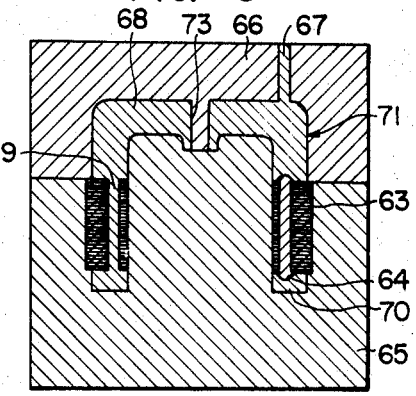
Figure 10:
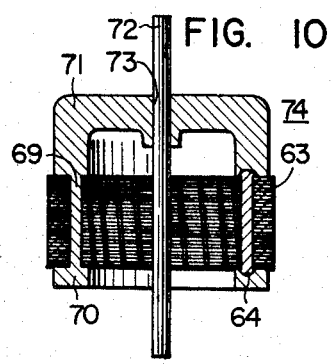

In the embodiment of the third method, as shown in FIGS. 8 to 10, slots 62 into which rotor conductors are to be respectively inserted are formed along the inner peripheries of such magnetic laminar 61 as annular silicon steel sheets forming an iron core of a squirrel-cage outer rotor, said magnetic laminar 61 are laminated to be an iron core 63 of a proper thickness by arranging the slots 62 or by twisting the slots 62 in the case of skewing the slots, conductor bars 64 made of a conductive material are passed in the laminating direction respectively through several of the above mentioned slots 62, the laminated magnetic laminae 61 as fixed with such conductor bars at both ends are put into die-casting metallic dies 65 and 66, a melt 68 of such conductive substance as, for example, aluminum is poured into the metallic dies through a pouring gate 67 in the die-casting metallic die 66 so that the above mentioned iron core may be molded integrally with rotor conductors 69, an end ring 70 and a housing 71 then the die-casting metallic dies 65 and 66 are removed and a rotor shaft 72 is pressed and secured in a rotor shaft fitting hole 73 formed integrally in the housing 71 so that a rotor 74 for an outer rotor type squirrel-cage induction motor may be made.

Figure 11:
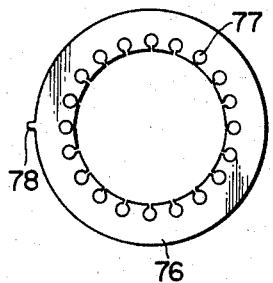

An embodiment of the fourth method shall be explained with reference to FIGS. 11 to 14. FIG. 11 shows a view in which slots 77 into which rotor conductors are to be respectively inserted are formed along the inner peripheries of such magnetic laminar 76 as annular silicon steel sheets forming an iron core 75 of a squirrel-cage outer rotor and projections 78 are further formed on the outer peripheries of the respective magnetic laminae 76. Said magnetic laminar 76 is laminated to be an iron core 75 of a proper thickness in a die-casting lower metallic die 80 in which is formed an engaging groove 79 which can engage with the projections 78 formed respectively on said magnetic laminar 76 by engaging the above mentioned projections 78 with said engaging groove 79, said iron core is fixed and held with a die-casting upper metallic die, a melt 83 of such conductive substance as, for example, aluminum is poured into the die-casting dies through a pouring gate 82 in said die-casting upper metallic die so that the iron core may be molded integrally with rotor-conductors 84, an end ring 85 and a housing 86, then the die-casting metallic dies 80 and 81 are removed, the projections 78 are cut off and a rotor shaft 87 is pressed and secured in a rotor shaft fitting hole 88 formed integrally in the housing 86 so that a rotor 89 for an outer rotor type squirrel-cage induction motor may be made.

According to this method, when the magnetic laminae 76 are laminated by engaging the projections 78 formed on the outer peripheries of the respective magnetic laminae 76 with the engaging groove 79 formed in the die-casting lower metallic die 80, the slots 77 will be naturally arranged.

Further, in the case of skewing the slots, the engaging groove 79 formed in the die-casting lower metallic die 80 may be formed diagonally.

In the above mentioned embodiment the projections 78 are formed on the outer peripheries of the respective magnetic laminae 76 and the engaging groove 79 which can be engaged with these projections is formed in the die-casting lower metallic die 80. But, in another embodiment, projections may be formed on the inner peripheries of the respective magnetic laminae and an engaging groove which can be engaged with these projections may be formed in the die-casting lower metallic die or recesses may be formed in the magnetic laminae and an engaging projection may be formed in the die-casting lower metallic die. Further, not only one but also several projections or recesses may be made in each magnetic laminar and engaging grooves or engaging projections to be engaged with them may be formed in the die-casting lower metallic die. Further, as the projections or recesses formed in the magnetic laminae are to arranged the slots into which rotor conductors are to be respectively inserted in laminating the magnetic laminae, after the die-casting, if the projections are removed by cutting off or the recesses are filled with an insulating substance or the like, there will be no unbalance.

Last an embodiment of the fifth method shall be explained with reference to FIGS. 15 to 18.

Slots 92 into which rotor conductors are to respectively inserted are formed along the inner peripheries of such magnetic laminar 91 as annular silicon steel sheets forming an iron core 90 of a squirrel-cage outer rotor. As shown in FIGS. 15 and 16, said magnetic laminar 91 is laminated to be an iron core 90 of a proper thickness by engaging one or several pins 94 provided to be free to come into or out of a die-casting lower metallic die 93 with the slots 92 formed in said magnetic laminar 91, said iron core is fixed and held with a die-casting upper metallic die 95, then, as shown in FIG. 17, the above mentioned pins 94 are pulled out of the slots 92, a melt 97 of such conductive substance as aluminum is poured into the dies through a pouring gate 96 in the die-casting upper metallic die 95 so that the above mentioned iron core may be molded integrally with rotor conductors 98, an end ring 99 and a housing 100, then the die-casting metallic dies 93 and 95 are removed and a rotor shaft 101 is pressed and secured in a rotor shaft fitting hole 102 formed integrally with the housing 100 so that such rotor 102 for an outer rotor type squirrel-cage induction motor as in FIG. 18 may be made.

The present invention is not limited to the above mentioned embodiments but can be variously modified without departing from the spirit of the present invention.

We claim:

1. A method of making squirrel-cage outer rotors for outer rotor type squirrel-cage induction motors comprising; a step of forming slots into which rotor conductors are to be respectively inserted along the inner peripheries of annular magnetic laminae which forms the iron core of the squirrel-cage outer rotor; a step of placing and temporarily holding said magnetic laminae in a laminated structure with a removable jig or fixture which holds the laminae on its inner periphery or its slots only by pressure contact so as to form an iron core of a proper thickness and with the proper arrangement of said slots, the said temporary holding of said laminate occurring without the welding or riveting together of the laminate; a step of putting the said iron core into die-casting metallic dies with at least part of the casting surface consisting of the said jig or fixture; a step of pouring a molten metal into said dies through a pouring gate in said die-casting metallic dies, thereby molding the said iron core integrally with said rotor conductors, an end ring short-circuiting said rotor conductors, and a housing; a step of removing the die-casting metallic dies and said jig fixture; and a step of pressing and securing a rotor shaft in the center of said housing.

2. A method of making squirrel-cage outer rotors for outer rotor type squirrel-cage induction motors according to claim 1 wherein said removable jig or fixture includes at least one pin provided so as to be free to come into or out of said die-casting metallic dies, and wherein the magnetic laminae are laminated by engaging the slot in each magnetic lamina with said pin and are fixed and held and then said pin is pulled out of the slot.

References Cited

UNITED STATES PATENTS 3,330,031  7/1967  Rediger et al. _____ 29—598

JOHN F. CAMPBELL, Primary Examiner

C. E. HALL, Assistant Examiner

U.S. Cl. X.R.

310—211